March 4, 1941.  C. R. KADDELAND  2,233,922
SHEET CUTOFF AND FEEDING MECHANISM
Filed Jan. 5, 1939  11 Sheets-Sheet 1
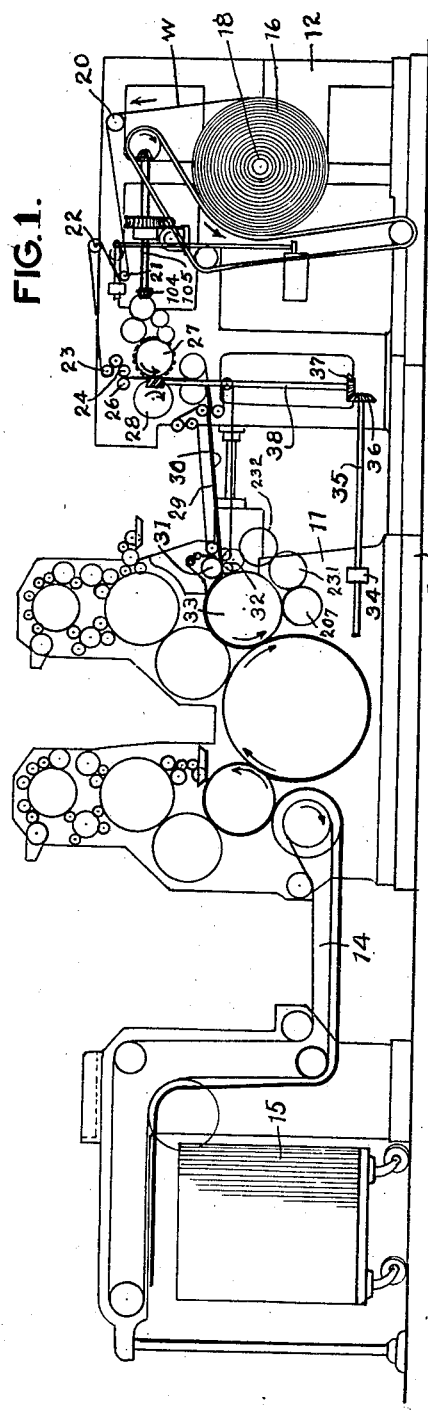
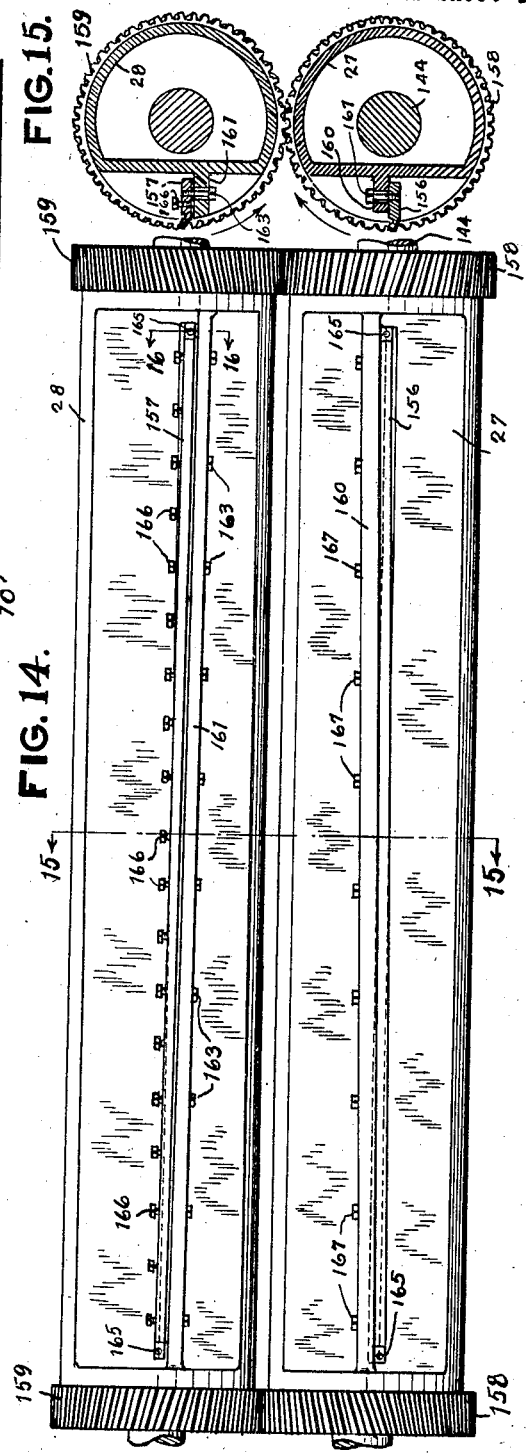
CHRISTEN R. KADDELAND.
BY *Kuris Hudson & Kent* ATTORNEYS

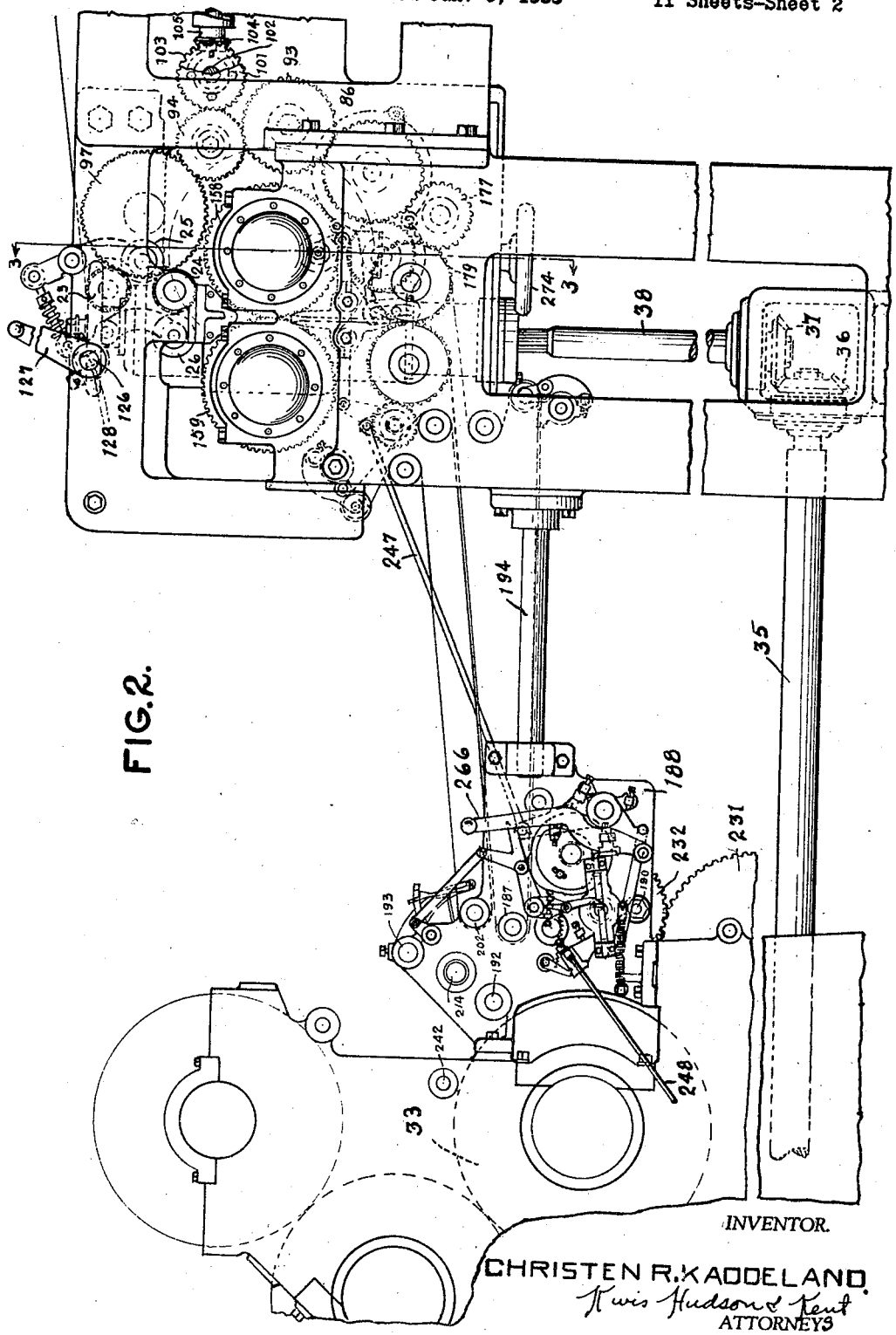

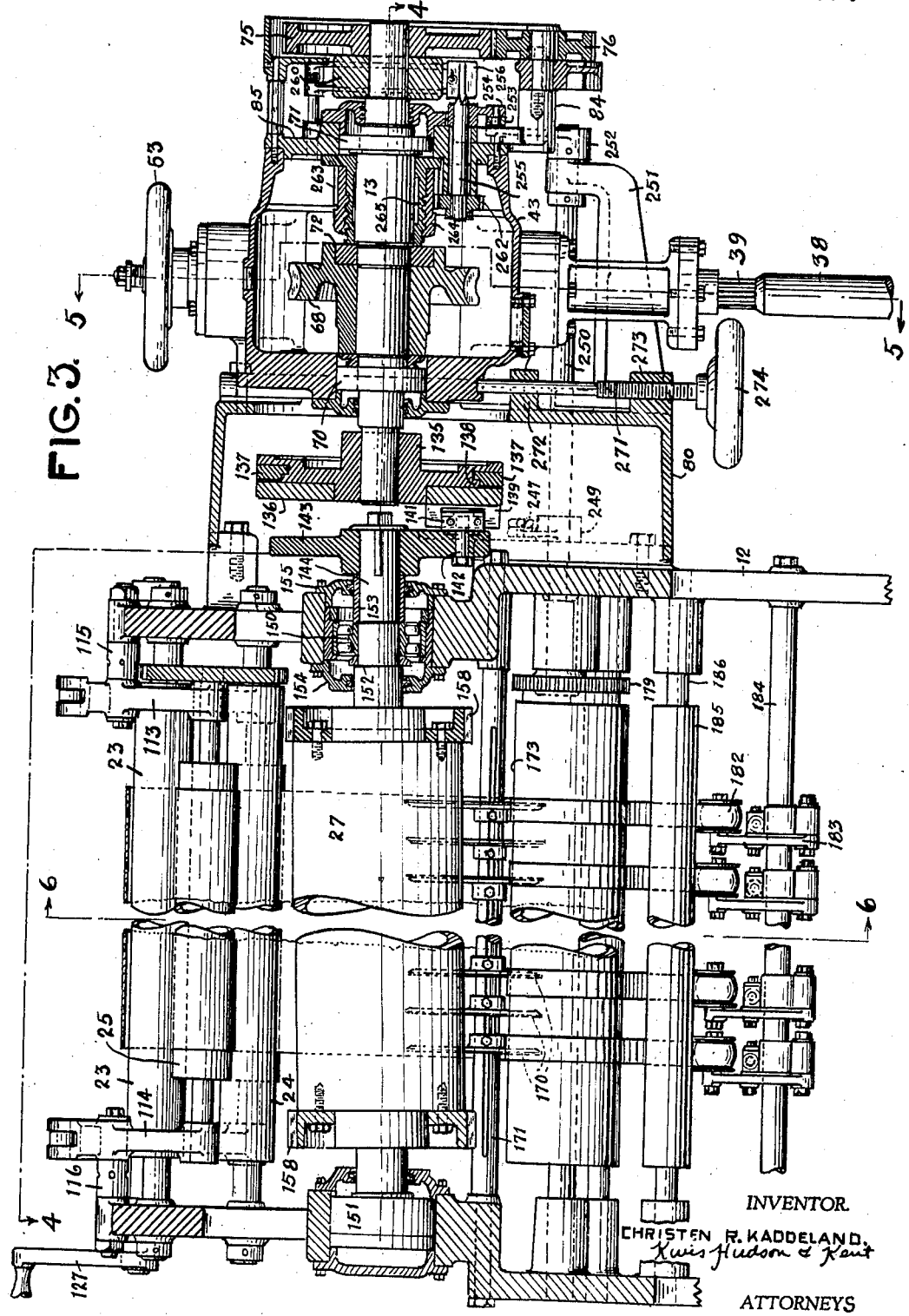

March 4, 1941.　　　C. R. KADDELAND　　　2,233,922
SHEET CUTOFF AND FEEDING MECHANISM
Filed Jan. 5, 1938　　　11 Sheets-Sheet 4

FIG. 4.

INVENTOR.
CHRISTEN R. KADDELAND.
ATTORNEYS

March 4, 1941.   C. R. KADDELAND   2,233,922
SHEET CUTOFF AND FEEDING MECHANISM
Filed Jan. 5, 1938   11 Sheets-Sheet 7

INVENTOR.
CHRISTEN R. KADDELAND
ATTORNEYS

March 4, 1941.  C. R. KADDELAND  2,233,922
SHEET CUTOFF AND FEEDING MECHANISM
Filed Jan. 5, 1938  11 Sheets-Sheet 8

INVENTOR.
CHRISTEN R. KADDELAND.
BY
ATTORNEYS

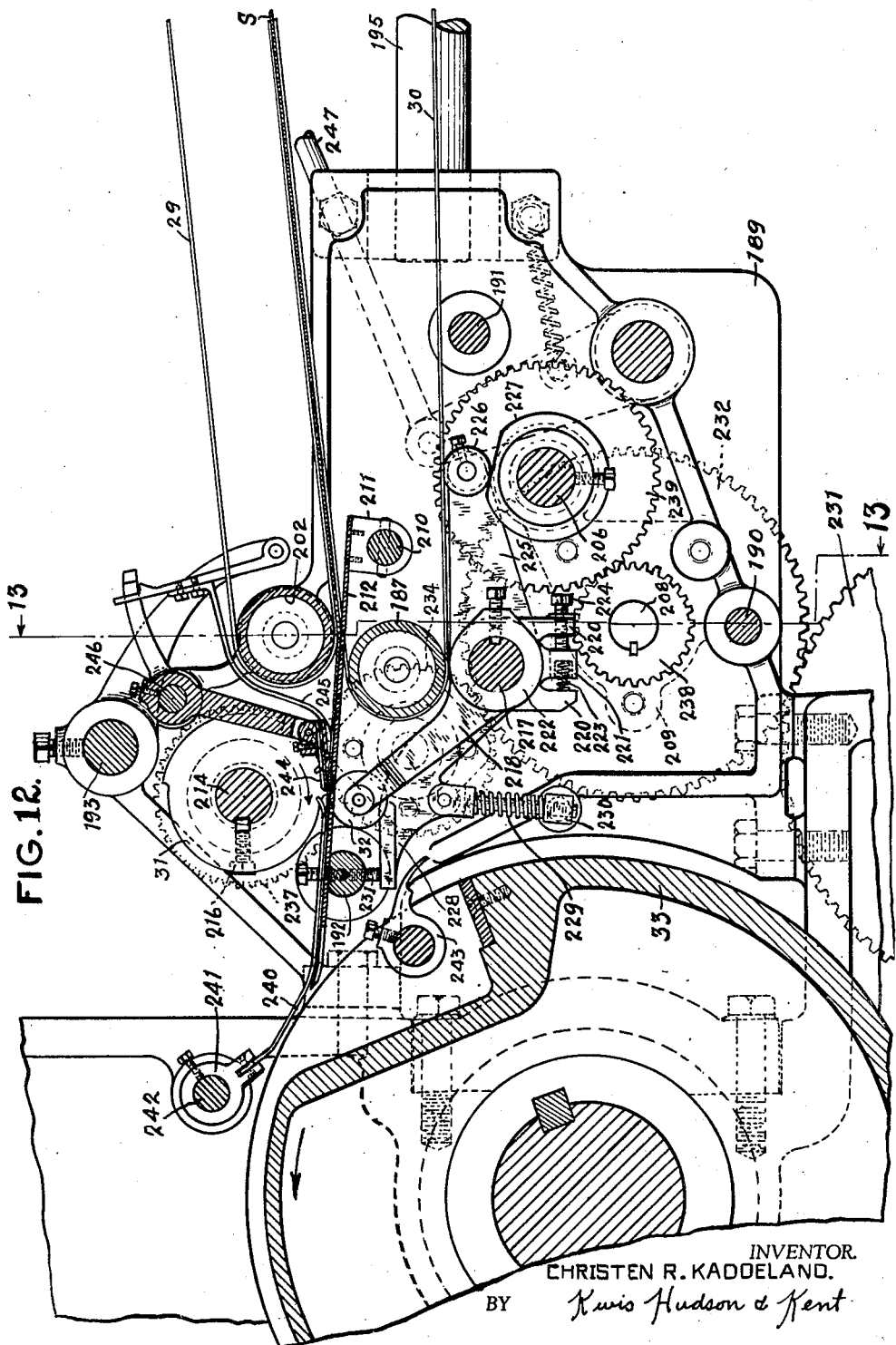

March 4, 1941. C. R. KADDELAND 2,233,922
SHEET CUTOFF AND FEEDING MECHANISM
Filed Jan. 5, 1938 11 Sheets-Sheet 10

INVENTOR.
CHRISTEN R. KADDELAND.
BY
ATTORNEYS

March 4, 1941.   C. R. KADDELAND   2,233,922
SHEET CUTOFF AND FEEDING MECHANISM
Filed Jan. 5, 1938   11 Sheets-Sheet 11

INVENTOR.
CHRISTEN R. KADDELAND.
BY
ATTORNEYS

Patented Mar. 4, 1941

2,233,922

UNITED STATES PATENT OFFICE 2,233,922

SHEET CUTOFF AND FEEDING MECHANISM

Christen R. Kaddeland, Shelton, Conn., assignor to Harris-Seybold-Potter Company, Cleveland, Ohio, a corporation of Delaware Application January 5, 1938, Serial No. 183,464

18 Claims. (Cl. 164—68)

This invention relates to improvements in sheet cutoff and feeding mechanism, that is to say mechanism for cutting sheets from a traveling web and feeding the severed sheets forwardly to a printing press, folder or other machine for operating upon them.

One of the objects of the invention is the provision of means for varying the speed of travel of the web. By this means, the movement of the web between the cutters, which are caused to perform a cutting operation at regularly timed intervals, regulates or determines the length of the severed sheets.

Another object is the provision of means for synchronously connecting the printing press or other machine with the sheet cutting and advancing means, comprising means for adjusting the synchronous relation between these two means and the press, whereby the location of the forward end of each sheet at a given instant with respect to the sheet taking point of the printing press or other machine may be regulated.

Another object of the invention is the provision of means for maintaining each sheet in motion and under continuous control from the time it is severed from the web until it is taken by the press or other machine to which it is being fed. By this means the difficulties incident to stopping the sheet for front or side register are eliminated and the rate of acceleration of the sheet in order to bring it up to press speed is greatly reduced.

Another object is the provision of an improved mechanism for regulating the angular velocity of the sheet cutting cylinders whereby the cutting knives may be made to engage the web during the shearing operation at a speed substantially corresponding to that of the web without affecting the synchronism between the cutting cylinders and the press.

Another object is the provision of means for detachably clutching the cutter drive, which clutching mechanism shall be adapted to maintain synchronism between the sheet cutters and the press at the point of cutting regardless of their accelerating and decelerating movements.

Another object is to provide means operating at a speed equal to or slightly greater than the speed of the web and variable therewith, for engaging the leading edge of the web before a sheet has been severed therefrom and advancing said edge, whereby the web is constantly maintained under tension while passing the sheet cutters, the leading edge of the web is always maintained in correct relation to the cutters, and the leading edge of the cut sheet is advanced in proper relation to the accelerating means by which the sheet is accelerated to the speed of the printing press.

Another object is to provide a mounting for the rotating cutter blades which shall enable a shearing cut to be made which is accurately straight and perpendicular to the length of the web, and to construct the mounting in such a way as to facilitate accurate adjustment of one blade in relation to the other.

Other objects and features of novelty will appear as I proceed with the description of that embodiment of the invention which, for the purposes of the present application, I have illustrated in the accompanying drawings, in which Fig. 1 is a side elevational view of a two-color printing press in connection with which my invention may be employed.

Fig. 2 is a fragmental side elevational view on a larger scale illustrating that portion of the web handling mechanism in which the cutters are located, and showing means for feeding the severed sheets toward the press.

Fig. 3 is a vertical transverse sectional view on a still larger scale, taken substantially on the line 3—3 of Fig. 2.

Fig. 4 is a horizontal sectional view of the same taken substantially on the line 4—4 of Fig. 3.

Fig. 12 is a side elevational view partly in longitudinal section illustrating the forward end of the sheet conveyor and the mechanism for feeding the sheets into the press.

Figure 13A:
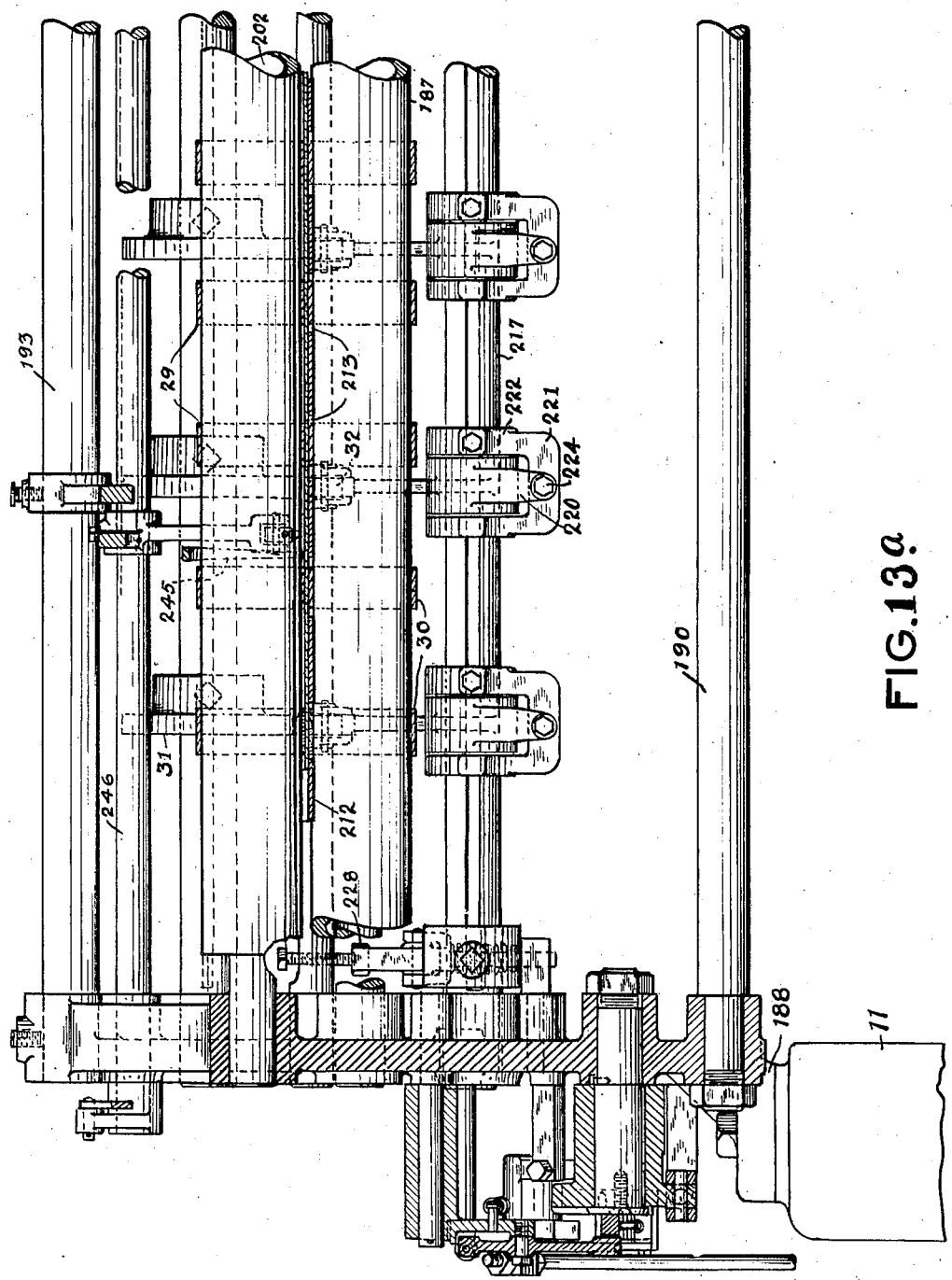
Figure 13B:
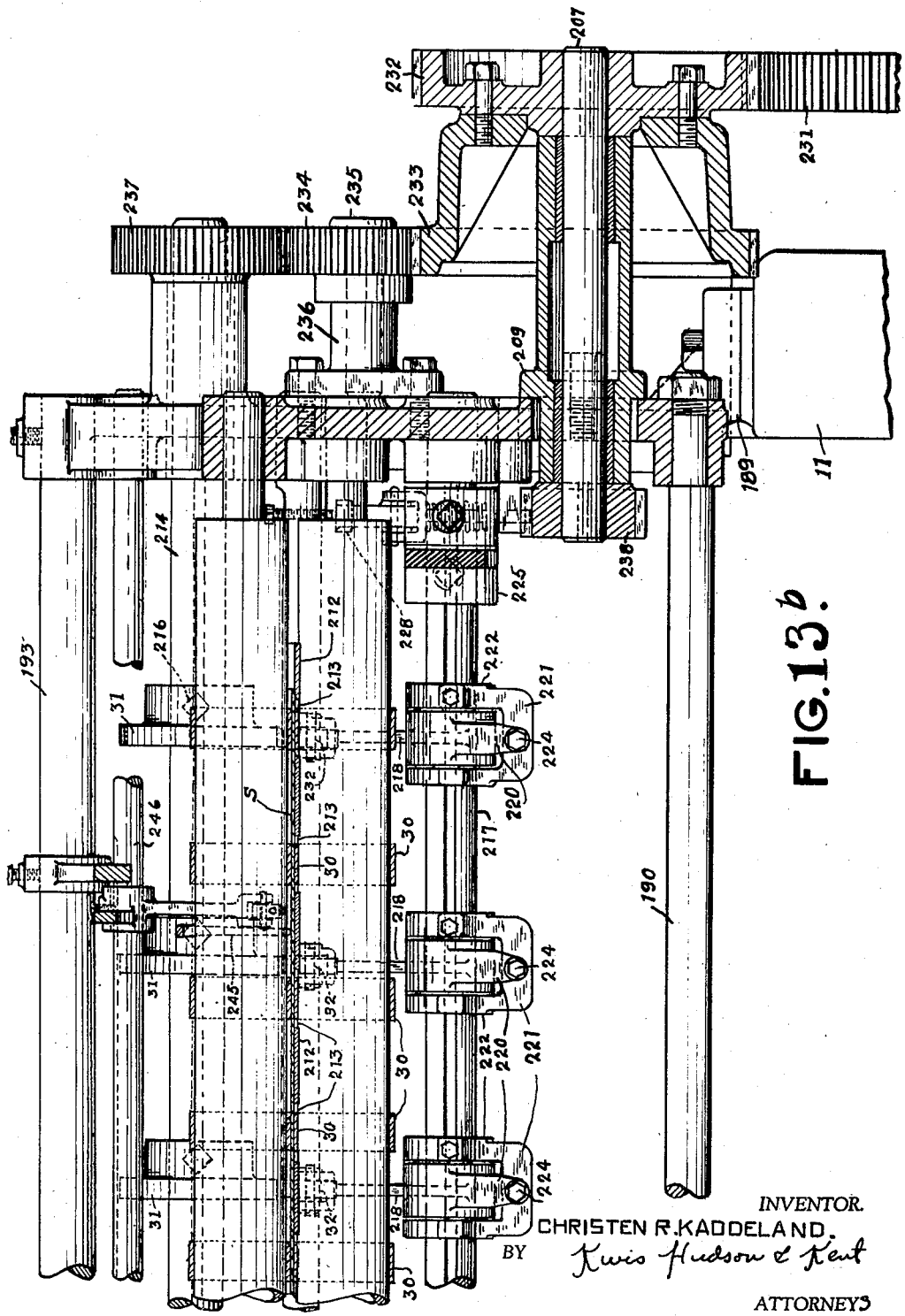

Figs. 13a and 13b together constitute a transverse vertical sectional view taken substantially on the line 13—13 of Fig. 12.

Fig. 14 is a detail plan view of the two cutting cylinders.

Fig. 15 is a transverse sectional view of the same taken substantially on the line 15—15 of Fig. 14.

Fig. 16 is a detail sectional view taken substantially on the line 16—16 of Fig. 14, and Fig. 17 is a detail sectional view of the feed-in mechanism for sheets, showing the parts in a position different from that of Fig. 12.

While in Fig. 1 I have illustrated the invention as applied to a printing press of a particular type, it is to be understood that this has been done by way of example merely, as the invention is useful in connection with printing presses of various kinds and in connection with other sheet handling machines. In Fig. 1 there is illustrated at 10 a machine base upon which there is supported a printing press 11 which may be of any known character or form, and upon the same base there is supported the frame 12 of my web feeder and sheet cutoff mechanism. After the sheet is operated upon by the press 11 it may be delivered by means of a conveyor 14 to a pile of finished product 15. 16 is a supply roll of paper mounted on a pair of spindles 18 carried by the frame 12 of the feeder. The roll 16 may be mounted in any suitable mechanism, including that disclosed in my copending application, Serial No. 183,462, filed January 5, 1938.

The web W of paper or the like is led over a guide roller 20, around tension control rollers 21 and 22, partially around web driving rollers 23 and 24 and an idler pressure roller 25 and downwardly between driving roller 24 and pressure roller 26 into position between cutting cylinders 27 and 28. Knives carried in the latter cylinders cut the web into sheets of desired lengths, and the sheets are carried between conveyor tapes 29 and 30 to the sheet feed-in rollers 31 and 32, and then to the impression cylinder 33 of the press, where the sheets may be printed in one or a plurality of colors, or operated upon in some other manner. A two-color printing press is shown diagrammatically in Fig. 1 in order to indicate that the invention is especially suitable for use with a multi-color printing press, but it should be pointed out that the invention is particularly adapted for use with printing presses which perform all of the desired operations to produce a finished product, as for example a four-color printing press. Thereby the necessity of handling the sheets for subsequent operations is avoided, and this is important especially in the case of certain kinds of material which are difficult to handle in the form of sheets, and where the register of subsequent operations with those previously performed is difficult and in some cases practically impossible if the sheets must be rehandled.

Figure 5:
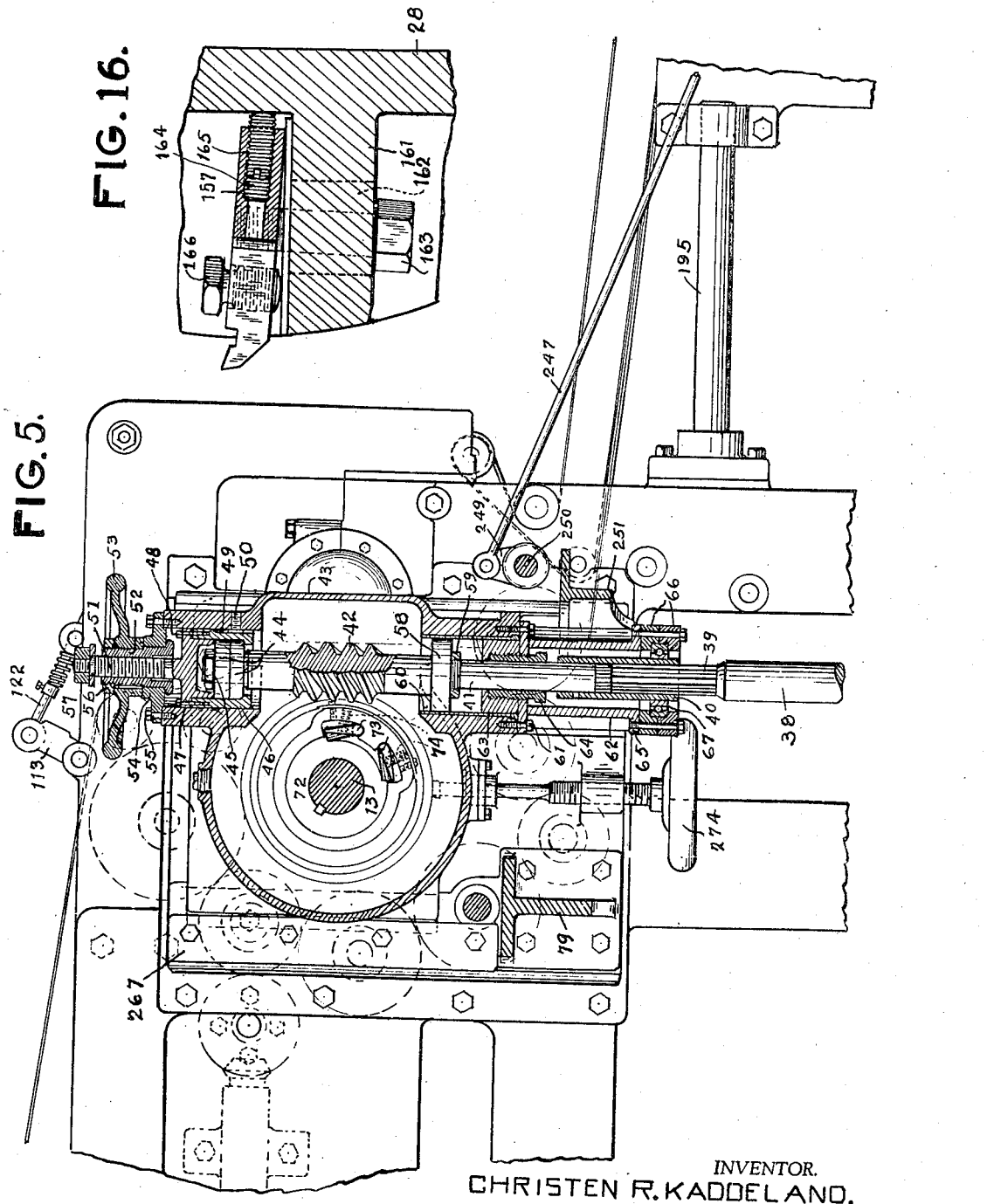
Fig. 5 is a vertical sectional view taken substantially on the line 5—5 of Figs. 3 and 4.

A suitable source of power such as an electric motor (not shown) may be connected to a pulley 34 to drive a shaft 35 positioned alongside the press and having bearings (not shown) in the press frame and the feeder frame. The shaft 35 is connected to the press by gearing (not shown) to drive the latter at a desired speed which is normally constant during the operation of the machine. The shaft 35 at its feeder end is provided with a bevel gear 36 which meshes with a similar bevel gear 37 fastened to a vertical shaft 38. Power is transmitted by this shaft to horizontal shaft 13 (see particularly Figs. 3, 4 and 5) mounted in a supplemental frame outside of the main frame. It is through this shaft 13 that drive for all parts of the web feeder and cutoff mechanism is transmitted.

The web feed

Shaft 38 is provided with splines 39 at its upper end which engage internal splines in a sleeve 40 (Fig. 5) that is pinned or otherwise fixed to the lower end of another vertically extending shaft 41. The shaft 41 is provided with a driving worm 42 and is mounted at its ends in a housing 43. The upper end of shaft 41 is equipped with a pair of radial and thrust bearings 44 held on the end of the shaft by a nut 45. The outer races of these bearings are engaged by a clamp consisting of a flanged sleeve 46 and a cap 47 held together by screws 48, the sleeve 46 being provided with a keyway 49 which engages the end of a screw 50 mounted in the housing 43 to prevent the sleeve 46 from turning. The sleeve 46 however is movable up and down within its opening in the housing. The cap 47 has a threaded extension 51 which engages threads in a sleeve 52 to which is keyed a hand wheel 53. A head 54 at the upper end of the housing is fastened thereto by screws 55. This head engages a flange at the lower end of the sleeve 52 and carries a nut 56 on its threaded upper end which is adapted to be threaded down against the hub of hand wheel 53. By this means the sleeve 52 is held against vertical movement in either direction. A nut 57 mounted on the constricted upper end of extension 51 limits the downward movement of the latter.

Near the lower end of shaft 41 there is an anti-friction bearing 58 held in place by a nut 59 and serving to center the shaft 41 in an opening 60 in the lower part of housing 43. Fastened to housing 43 by means of screws 61 is a smaller housing 62 having an upwardly extending portion 63 which fits in the lower part of the opening 60. This latter housing has an opening for the lower end of shaft 41 and is provided with a stuffing box 64 of usual design to prevent the downward seepage of oil used on the driving worm and in the anti-friction bearings. The housing 62 also has a downwardly extending portion provided with a flange 65 to which are bolted two clamp rings 66 for supporting the outer race of an anti-friction bearing 67 through which the sleeve 40 previously mentioned slidably extends.

From the foregoing description it will be apparent that the shaft 41 may be raised and lowered by rotation of the hand wheel 53 while its driving connection to shaft 38 will be preserved by virtue of the sliding joints between the splines 21 and those carried internally by sleeve 40, as well as by virtue of the sliding connection between the sleeve 40 and the inner race of anti-friction bearing 67.

The driving worm 42 meshes with a worm wheel 68 which is rotatably mounted upon shaft 13. This shaft is a relatively short shaft mounted outside of the feeder frame 12 in the housing 43. A combination radial and thrust anti-friction bearing 70 supports one end of the shaft in the housing and a radial bearing 71 supports the other end.

Keyed to shaft 13 is a collar 72 provided with two oppositely disposed notches which during normal operation of the machine are engaged by a pair of pawls 73 that are carried on pins in the worm wheel 68 and are pressed into the notches in collar 72 by springs 74.

The shaft 13, as described more fully later, serves to drive the web feeding mechanism, the sheet cutters, and the sheet conveying mechanism. By means of the vertical adjustment of shaft 41 and the worm and worm wheel connection 42, 68, the angular relationship of shaft 13 to shaft 41 may be varied, as desired, during operation of the machine, thus permitting adjustment of the relationship of the sheet cutters and sheet conveying mechanism to the press. Furthermore the two-way clutch, consisting of pawls 73 and collar 72, serves to maintain a desired angular relationship between shaft 13 and shaft 41 independently of the variable character of the load on shaft 13.

To the outer end of shaft 13 is keyed a gear 75 which is removable and interchangeable with gears of different size, the one selected being dependent upon the length of sheet to be cut, as hereinafter described. This gear 75 meshes with an idler gear 76 which in turn meshes with a gear 77 keyed to a shaft 78. The shaft 78 is supported near its outer end by a bracket 79, (see Figs. 4 and 8) bolted to a housing 80 which in turn is bolted to the feeder frame 12. At its inner end the shaft 78 is journaled in the frame 12. The idler gear 76 is carried on an arm 81, Fig. 7, which is pivotally mounted on the shaft 78 and provided at its outer extremity with a slot 82 through which extends a bolt 83 for clamping the arm 81 against the boss 84 on the end plate 85 which forms a part of the housing 43. By this means the idler gear 76 may be swung about the center of gear 77 to mesh with gear 75 regardless of the size of that gear.

At the inner end of shaft 78 there is keyed another gear 86 of the same diameter as the gear 77. Gear 86 operates through intermediate gears 93 and 94 mounted on studs 95 and 96 respectively to drive a gear 97 which is journaled on a stud 98 in the frame. Gear 97 drives a gear 99 fixed to the roller 23 and a gear 100 fixed to roller 24.

Meshing with the gear 94 is another gear 101 journaled on a stud 102 in the frame. A bevel gear 103 is bolted to gear 101, and drives a bevel pinion 104 keyed to the end of shaft 105 which extends towards the front of the machine and serves to drive the devices which control the tension of web W. These devices are not herein illustrated in detail, but a full disclosure with respect to them may be found in my copending application Serial No. 183,463, filed January 5, 1938.

The web feeding rollers 23 and 24 are rotatably mounted upon shafts 111 and 112 held stationary in the frame 12. As previously described, the rollers 23 and 24 are provided with gears 99 and 100 which are driven at constant speed by the gear 97. Cooperating with rollers 23 and 24 are idler rollers 25 and 26 which serve as pressure rollers. The roller 25 is supported at its ends in arms 113 and 114 which are pivotally mounted respectively on studs 115 and 116 in the feeder frame. The length of the arms and the location of the studs are such that the roller 25 bears against both of the rollers 23 and 24, the web W extending around the roller 25 and between that roller and the rollers 23 and 24. The roller 26 is similarly mounted in arms 117 and 118 pivotally mounted on studs 119 and 120. The studs 115, 116, 119 and 120 are preferably made eccentric to permit adjusting the mountings for rollers 25 and 26 so as to bring those rollers into position and parallelism.

Figure 6:
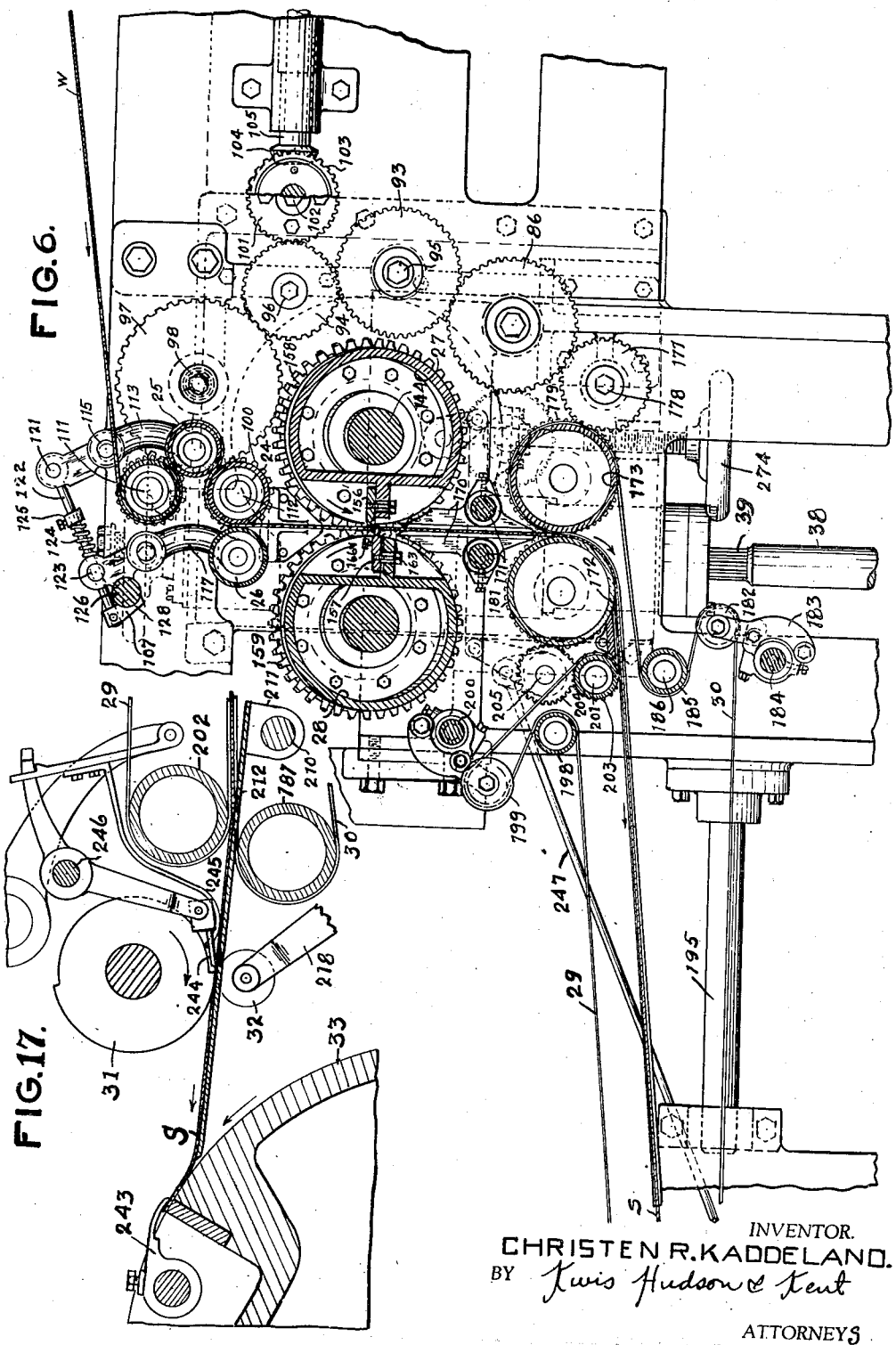
Fig. 6 is a vertical sectional view taken longitudinally of the machine on the line 6—6 of Fig. 3 substantially, and showing the web advancing and web cutting mechanisms as well as the rearward portion of the sheet conveying mechanism.

Each of the arms supporting the rollers 25 and 26 is formed at its upper end with a bifurcated portion. Referring to Fig. 6, the bifurcated end of arm 113 has a pin 121 which supports the end of a connecting rod 122 extending through the pin 123 in the bifurcated end of arm 117. The rod 122 is provided with a head 107, a spring 124 and a collar 125. The pair of arms 114 and 118 are supplied with similar connections for the purpose of urging the pressure rollers 25 and 26 toward operative position.

Rotatably journaled in the feeder frame is a shaft 126, to one end of which is fastened a hand lever 127, Figs. 2 and 4. Shaft 126 is provided with flat portions 128 which cooperate with the heads 107 on rods 122 and with flat surfaces on the upwardly extending portions of arms 117 and 118. When the shaft 126 is rotated through a small angle it acts to separate the heads 107 and the upper parts of arms 117 and 118, and to compress the springs 124, thus tending to pull the upper ends of the arms together and to separate the lower ends of these arms and by this means to move the pressure rollers 25 and 26 away from the web driving rollers 23 and 24. By this means the web of paper W may be threaded around and between the rollers 23, 24, 25 and 26 when the machine is set up for operation.

From the foregoing it will be seen that in the normal operation of the machine the web feeding rollers 23 and 24 and the web tension controlling shaft 105 will be driven at constant speeds, and that these speeds will vary, depending upon the size of the interchangeable gear 75 which is employed. By varying the speed of travel of the web different lengths of web are caused to pass the cutting knives between successive operations of those knives, the latter being so connected to shaft 13 as to perform one cutting operation for each revolution of this shaft, and therefore of the press, as later described. By the use of the invention therefore it is possible to cut from the web sheets of any one of a plurality of different lengths, depending upon the size of the gear 75 which is employed.

*Cutoff mechanism*

At the end of shaft 13 toward the cutting cylinders is keyed a hub 135 on which is mounted a driving disk 136 held in place by a pair of clamping segments 137 bolted to the driving disk so as to clamp a flange 138 of hub 135. The disk 136 is provided with projections 139 which form a slot 140. This slot engages a block 141 carried on a pin 142 in a driven disk 143 which is keyed to the end of the shaft 144 on which the cutting cylinder 27 is fixed. Thus, the short shaft 13, by means of slot 140 and block 141, drives the cutting cylinder 27 while permitting the shaft 13 to be offset with respect to the shaft 144 and to be at a slight angle thereto. The disks 136 and 143 and their associated parts together constitute a Whitworth crank mechanism. When the axes of the two shafts 13 and 144 meet, the drive from shaft 13 to shaft 144 is at a constant speed. When the two shafts are offset more or less, shaft 144 is caused to have the same number of revolutions per minute as shaft 13, but the motion is not regular, that is to say the shaft 144 in each revolution has a period of acceleration and one of deceleration.

Shaft 144 is journaled at its ends in the frame 12 on anti-friction bearings 150 and 151. The inner race of bearing 150 is held against shoulder 152 of shaft 144 by a spacer 153 held in place by the driven disk 143. The outer race of the bearing is preferably positioned in the frame by means of the cover plates 154 and 155, bolted to the frame. The bearing at the other end of the cylinder is similarly mounted.

The cylinder 27, instead of being set with its axis exactly perpendicular to the direction of web travel, is inclined slightly from that perpendicular as shown in Fig. 3 and cylinder 28 is set at a similar angle to cooperate properly with cylinder 27. At each end of cylinder 27 there is a spiral gear 158 which meshes with a similar spiral gear 159 on the cylinder 28, and by this intergearing these cylinders are maintained in absolute synchronism to assure accuracy of cutting action. Cylinders 27 and 28 are provided with cutting knives 156 and 157 respectively which are mounted at angles to their cylinder axes complementary to the angles of the cylinder axes with the perpendicular to the direction of web travel, whereby during the cutting operation a shearing action is obtained which begins at one side edge of the web and proceeds across the latter arriving at the other side after the cutting cylinders have rotated an amount depending upon their inclination.

In known cutting machines of this type it has been customary to provide a plain surface on each of the cutting cylinders to which the knife is fastened, this plain surface having the desired angularity to the cylinder axis. It is a well known fact that blades mounted in this manner produce a slightly bowed cut rather than an accurate straight-line cut.

According to my invention an accurate straight-line cut across the web is obtained by providing machined surfaces on the cutting cylinders which are helical in contour with the pitch angle of the helix complementary to the angle of inclination of the cylinders. Furthermore, I provide very simple means for making slight adjustments of one blade to attain accurate cooperation with the other blade which may be necessitated because of small inaccuracies in the machining of the helical surfaces.

The knife 156, which is somewhat flexible, is fixedly supported upon a rib 160 projecting from a flattened part of cylinder 27. The helical contour of the blade is secured by machining a side wall of rib 160 to a helical contour and drawing up the flexible blade to that wall by means of studs 167. Blade 157 is carried by a similar helically machined rib 161 projecting from a flattened part of cylinder 28. This blade, although rigidly mounted upon its rib, is capable of slight adjustment with respect to the rib, as illustrated particularly in Fig. 16. Slots 162 are formed through rib 161 at regular intervals along the line of that rib for the reception of studs 163 which extend into threaded openings in the blade 157. Also, at the ends of the blade there are sockets 164 for the reception of set screws 165 which are adapted to bear against the flattened wall of the cylinder and may be adjusted to determine the radial position of the cutting edge. At frequent intervals along the length of the blade there are other threaded openings, substantially parallel to the openings for studs 163, in which are mounted set screws 166 that are adapted to bear against one side of rib 161. By properly adjusting these screws 166 the cutting edge of blade 157 may be brought into accurate register with the cutting edge of blade 156 at closely spaced points all across the length of the blades. In other words the cutting edge of blade 157 may be caused to follow a helical line precisely like that of blade 156 and cooperating therewith with a high degree of precision. This construction, combined with the spiral gears 158 and 159 which insure accurate angular relationship between the cylinders 27 and 28, and combined with the inclination of the cylinder axes, brings about a straight-line cut transversely of the web, that is if the speed of movement of the knives at the point of cut be the same as the speed of travel of the web, which is true of my machine because of the character of the drive to the cutters, that is through the Whitworth crank mechanism previously described. When the adjustment of the various set screws 166 is effected to a nicety, the studs 163 are tightened down and the cutters are ready to operate.

Figures 9, 10, 11:
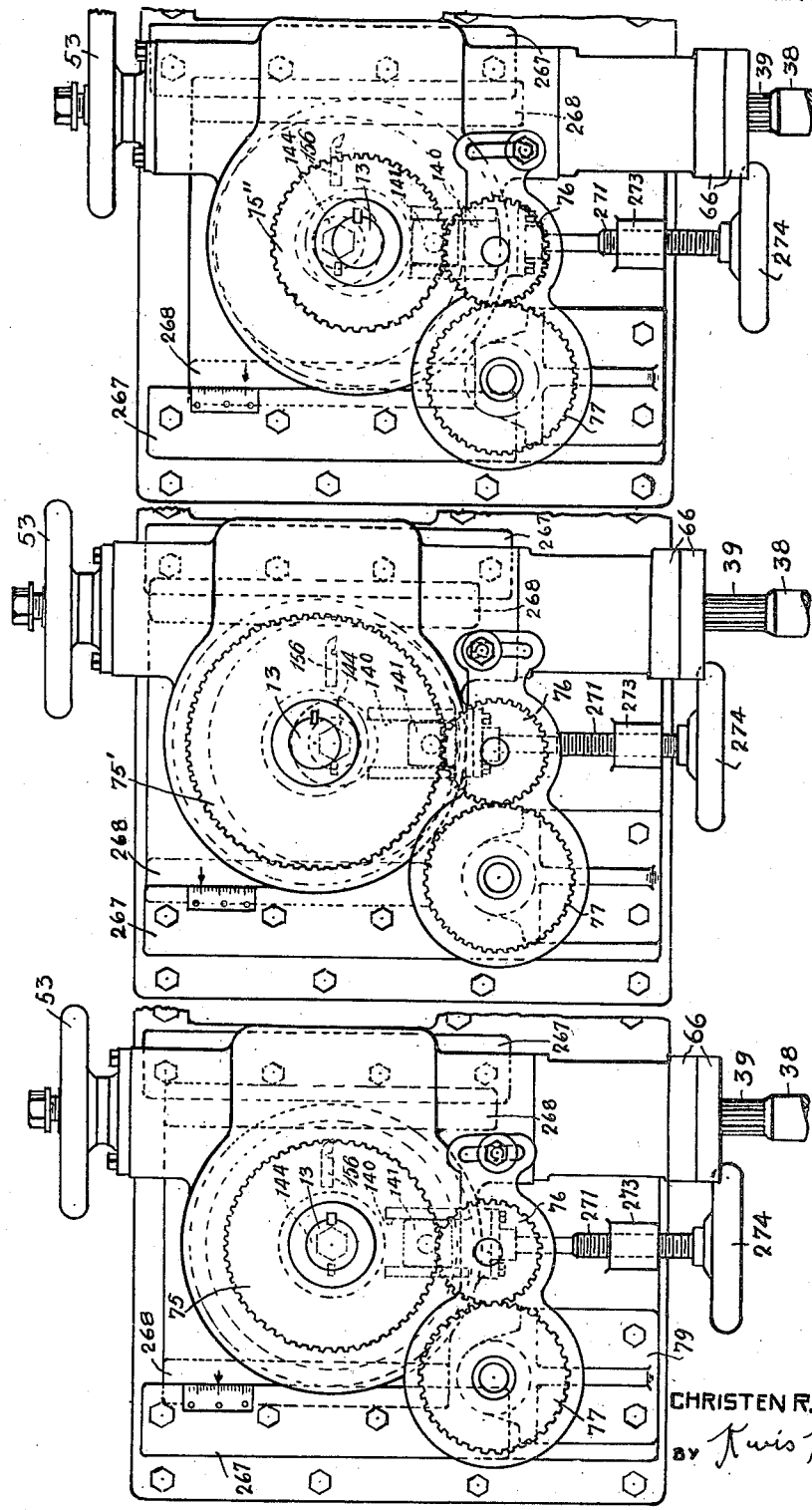
Figs. 9, 10 and 11 are views similar to Fig. 7 showing three different change speed gear trains by which the speed of travel of the web is controlled and the consequent length of sheet severed from the web between cuts is determined.

In order that the machine may be adapted to a variety of work the mechanism is arranged to be adjustable for sheets of different lengths. As previously stated, the gear 75 on the shaft 13 may be one of a number of different sized gears, depending upon the length of sheet which it is desired to cut from the web. In Figs. 9, 10 and 11 three such gears of different sizes are illustrated, that of Fig. 10 being numbered 75' and being larger than the gear 75 of Fig. 9, while that of Fig. 11 is numbered 75" and is smaller than gear 75 of Fig. 9. The shaft 13 is driven at a constant speed and in fixed ratio to the speed of the press because of its direct connection to the latter. This ratio must be one-to-one in the illustrated form of the invention since the shaft 13 is connected through the slot 139 and block 141 with the cutting cylinders, and the latter must cut one sheet for each sheet taken by the press.

Since the gear 75 is directly connected to the web supply mechanism and the web feeding rollers 23 and 24, its diameter will determine the length of the web measured off by these feeding rollers. Therefore it will determine the length of web fed between the cutting knives at each revolution of the latter and will therefore determine the length of sheet severed from the web. The gear 75 is also connected with tape driving rollers 173 and 203, and therefore determines the speed with which the cut sheets marked S in the drawings are forwarded. These tapes are preferably driven slightly faster than the web, and for this reason the cut sheets S will be forwarded slightly faster than the web with the result that a slight gap will develop between successive sheets as they move toward the press.

It is apparent that for a particular speed of web, that is for a particular length of sheet, the cutting knives may be driven with a constant angular velocity resulting in a peripheral speed equal to the linear speed of the web, in which case they will travel in synchronism with the web as they make the cut and will cause no buckling of the web material nor any angularity of the cut. In accordance with my invention, when the web is driven at a different speed than that required for the particular length of sheet above mentioned, that is when the sheet length is either greater than or less than the particular length above referred to, the angular speed of the cutting knives is varied during each rotation in such a manner as to cause their peripheral speed to coincide with the speed of the web at the moment of cut while the interval between cuts remains unchanged as determined by the speed of rotation of shaft 13. In bringing about this result the drive between the shaft 13 and the cutting cylinder shaft 144 is effected through the Whitworth crank mechanism before described, and provision is made for raising and lowering the shaft 13 so as to change the effective driving radius of the disk 136 to vary the speed of the cutting cylinders.

Referring to Fig. 3, it should be noted that the slot and block are located one quarter turn in advance of the cutting knives so that they are at the low points of their travel at the time the cutting knives are cooperating to shear the web. The preferred arrangement is that the shafts 13 and 144 are substantially concentric when the size of sheet being cut is the mean between the extremes of the capacity of the machine. This condition is illustrated in Figs. 3, 4, 7 and 9. Under these conditions the effective radius of the driving disk 136 is equal to that of the driven disk, and the knives rotate with uniform speed.

If it is desired to set the machine for cutting a longer sheet the gear 75 is replaced with a larger gear as shown at 75' in Fig. 10, and the shaft 13 is raised so as to increase the effective radius of the driving disk 136 at the time the cut is made, and therefore to impart a higher speed to the cutting knives at that time. When it is desired to cut a shorter sheet the gear 75 is replaced by a smaller gear, for example 75'' of Fig. 11, and shaft 13 is lowered with the result that the effective radius of the driving disk 136 at the time the cut is made is less than that of the driven disk 143, and the knives are given a correspondingly slower speed at that time. The design is such that the cut is made in the first instance while the knives are at the maximum speed which they attain in each rotation and in the second instance while the knives are at their minimum speed. Thus they shear the web during the transition from acceleration to deceleration in one case and from deceleration to acceleration in the other, that is, during the time their velocity is momentarily substantially constant.

In order that shaft 13 may be raised and lowered accurately to the desired position for adjusting the cutting knives to the desired speed of web travel, the housing 80 is provided with a pair of gibs 267 which are secured to the housing by bolts. The worm wheel housing 43 is formed with flanges 268 which cooperate with the gibs 267, so that housing 43 may be slid up and down relative to housing 80 under the gibs 267. One of the gibs carries a scale 269 and the housing 43 has an index mark 270 by means of which the relative position of the housing 43 may be read. Between the flanges 268 and below the housing 43 there is a screw 271, the upper end of which bears against the lower side of the housing 43. This screw extends through lugs 272 and 273 formed in the housing 80, and the lug 273 is internally threaded to receive the threads of the screw. The latter has a hand wheel 274 attached to its lower end. Thus, rotation of the hand wheel 274 in one direction will raise the housing 43 and in the other direction will permit the housing to descend by gravity.

The cutting cylinder are provided with shooflys or web guides of known design located directly above the cutting point of the knife cylinders. Stationary guides 170 arranged below the cutting point direct the freshly cut edge of the web along its proper path. Guides 170 are secured at intervals on the rods 171 which are supported in the side frames of the feeder. After the knives have cut a sheet from the web the latter continues to be fed along by web driving rollers 23 and 24 and the cutting cylinders have no further action upon the web, since the distance between the centers of rotation of the cutting cylinders is somewhat greater than the body diameter of one of them. The web travels between the guides 170 and continues to be fed by the feeding rollers until its front edge enters the bight between a roller 172 and tapes which extend around and are driven by a roller 173.

*Sheet conveyor and feed-in mechanism*

Referring again to Fig. 6, gear 86 meshes on its lower side with an intermediate gear 177 journaled on a stud 178 in frame 12. This idler gear 177 drives a gear 179 fixed on the tape driving roller 173, which in turn drives a gear 181 fixed on the roller 172.

After the sheets have been cut by the cutting knives they are conveyed by tapes to a point adjacent the impression cylinder of the press and thence into the latter. The lower tapes 30 (see particularly Figs. 6 and 12) are trained around individual tightening rollers 182 mounted to rotate on spring actuated arms 186 carried by shaft 184, which extends between the side frame members of the feeder. These tapes pass around idler roller 185 which runs on a shaft 186, and are trained around roller 173, about one-quarter of the way around roller 172, and thence extend toward the press to a roller 187 rotatably journaled in frame members 188 and 189 bolted to the frame of the press. These frame members are connected together by tie rods 190, 191, 192 and 193, and they are connected to the feeder frame by bars 194 and 195 supported in appropriate brackets at their ends. From the roller 187 the tapes 30 return to the tightening rollers 182.

The upper tapes 29 are trained about an idler roller 198, tightening rollers 199 supported on a shaft 200 in a manner similar to the rollers 182, and from there around a tape driving roller 201, from which point they extend toward the press and around a roller 202 rotatably journaled in frame members 188 and 189. From this point the tapes 29 extend back to idler roller 198.

The driving roller 201 for the upper tapes 29 carries a gear 203 which meshes with a gear 204 that is journaled on a stud 205 on the inside of the frame. This gear 204 in turn is driven by gear 181 on roller 172.

The gearing for driving the tapes and the diameters of the tape driving rollers are preferably such that when the leading edge of the web enters the bight between the roller 172 and the tapes 30 passing over roller 173 a slight tension is placed on the web so as to keep it taut prior to the cutting of the next sheet. In other words the speed of the tapes is slightly greater than the speed of the web feeding rollers and a slight slippage between the tapes and the web occurs. Furthermore, since the drive for the tapes is taken from gear 86 which in turn is driven by the interchangeable gear 75, the speed of the tapes will depend upon the size of the latter gear and will always bear a given relation to the speed of the web. In this way substantially uniform tension may be maintained on the web without regard to the speed of the latter.

Referring now to the feed-in mechanism employed for transferring sheets from the forward end of the conveyor, there is a rod 210 extending between the frame members 188 and 189 on which are located brackets 211 which support a feed plate 212 that is formed along its rear edge with slots 213 through which the upper-runs of the lower tapes 30 are arranged to pass. The forward end of the feed plate 212 is supported on the flattened upper surface of rod 192, and extends to within a short distance of the surface of the impression cylinder. The front portion of the plate is slotted so that the open sheet grippers of the impression cylinder may pass through the plate.

In the upper portion of the frame members 188 and 189 there is journaled a shaft 214 to which are keyed a plurality of feed wheels 31 held in place by set screws 216. These feed wheels are formed with a portion of their peripheries higher than the remainder for the purpose of engaging the upper surface of a sheet lying on the feed plate 212 and driving the sheet forward during a portion of a revolution of the feed wheels sufficient to insure the sheet reaching the grippers on the impression cylinder of the press. Although I have not illustrated sheet stops on the impression cylinder, such stops may be provided and the sheet may be driven against them at a speed slightly greater than the speed of the impression cylinder so as to produce a slight buckling of the sheet, all in known manner, and as shown in Patent No. 1,307,969, issued to A. F. Harris on June 24, 1919.

Below the feed plate and oscillatably mounted in the frame members 188 and 189 is a shaft 217 which supports a series of lower feed roller arms 218 each of which carries at its upper end a freely turning roller 32. These arms are freely mounted on the shaft 217, and each one is formed with two ears 220 which are positioned on opposite sides of a lug 221 formed in collars 222 which are keyed to the shaft 217. A spring 223 is interposed between one of the ears 220 and the lug 221 and a screw 224 is located in the other ear, by means of which the angular position of the arms 218 may be adjusted with relation to the shaft 217 so that all the rollers 219 may be set to have angular positions that are identical.

Near one end of shaft 217 and inside the frame member 189 there is keyed to the shaft a lever 225 carrying a follower 226 which cooperates with a cam 227 fixed to a shaft 206 which rotates once for each revolution of the press. By this means the shaft 217 is given a short oscillation so that the rollers 32 may be raised through appropriate openings in the feed plate to a position contacting the lower surface of a sheet lying on the feed plate 212 and may be lowered to a position below the feed plate to break contact with the sheet. Each time a sheet is brought into proper position the lower rollers 32 rise into cooperation with the higher portions of the peripheries of the upper feed wheels 31 to pinch the sheet between these rollers and wheels and drive it forward.

At each end of the shaft 217 just inside the frame members 188 and 189 are spring levers 228 which are keyed to shaft 217 and which through the medium of springs 229 acting against noddle pins 230 in the frame tend to rotate shaft 217 clockwise and keep the roller 226 in contact with the cam 227. The outer end of each of the spring levers 228 is formed with a surface which engages a stop screw 231 in the rod 192. By this means the upward movement of the rollers 219 may be limited independently of the shape of the cam 227.

Drive for the sheet transfer mechanism and associated parts comes from the impression cylinder 33 which it may be assumed carries the usual gear, the latter meshing with an idler gear 207 (see Fig. 1) mounted on the frame of the press and driving another idler gear 231 which in turn drives a gear 232. The latter gear is carried upon a shaft 208 which is mounted in a bracket 209, see Fig. 13b. On the inner side of gear 232 there is bolted another gear 233 of the same pitch diameter which meshes with an idler gear 234 journaled on a stud 235 carried in a bearing bracket 236 bolted to the frame member 189. The idler gear 234 drives a gear 237 keyed to one end of the upper feed wheel shaft 214. It is apparent therefore that the upper feed wheels are driven at constant speed in synchronism with the operation of the press.

The parts are preferably proportioned so that the upper feed wheels 31 make a whole number of revolutions for each sheet fed to the press so that successive sheets may be fed in identical manner as determined by the position of the leading end of the high portion of the feed wheel periphery. It is also desirable that the peripheral speed of the feed wheels be equal to or slightly greater than that of the impression cylinder in order that the sheets may be positioned on the cylinder substantially independently of the time of closing of the cylinder grippers and avoid interference with the latter.

At the inner end of the short shaft 207 there is keyed another gear 238 which meshes with a gear 239 keyed to shaft 206. The gearing is such that the shaft 206 makes one revolution for each revolution of the impression cylinder, that is for each sheet fed to the press.

As each sheet is driven toward the impression cylinder by the transfer mechanism it is guided between the feed plate 212 and a series of overguides 240 which are supported in holders 241 on a shaft 242 mounted in the frame of the press, and when its forward edge reaches the proper position, indicated in Fig. 17, sheet grippers 243 close upon it and carry it into the press. Suitable means may be provided for stopping the feeder in the event of a failure to feed a sheet to the impression cylinder or in the event of a crumpled or folded sheet being advanced to the impression cylinder. While these features of the invention form no part of the present application, an absence-of-sheet detector is illustrated at 244 and a sheet choke at 245. These parts are operatively connected with a shaft 246 and function through connections and controls, not shown, to actuate a rod 247 which moves longitudinally to throw out the feeder clutch and apply the brake. Simultaneously another control rod 248, Fig. 2, may be actuated to trip the press.

The control rod 247 extends back toward the web feeding and sheet cutoff mechanism and is attached to an arm 249 keyed to a shaft 250 oscillatably mounted at one end in the feeder frame 12 and at the other end in a bracket 251 (Fig. 4) bolted to the stationary housing 80. At the other end of this shaft is keyed a lever 252 which is joined by a link 253 to an arm 254 pinned to a short shaft 255 loosely carried in the bearing plate 85 which forms part of housing 43.

Figure 8:
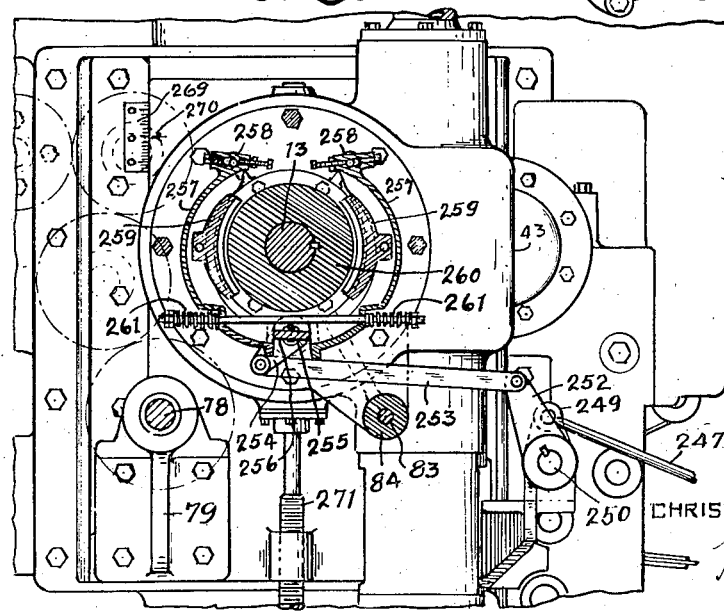
Fig. 8 is a vertical sectional view taken substantially on the line 8—8 of Fig. 4.

The outer end of short shaft 255 is formed into a widened and flattened wing 256 which occupies a position between the lower ends of a pair of brake shoe supports 257 pivotally mounted on pins 258 supported in the plate 85 and carrying brake shoes 259 which engage a brake drum 260 keyed to shaft 13. When the flattened portion 256 of shaft 255 is in a horizontal position, as shown in Fig. 8, the brake shoes are spaced apart and released from engagement with the brake drum. When the flat portion occupies a vertical position the brake shoes are allowed to come together under the action of springs 261 and engage the brake drum to stop shaft 13.

At the inner end of short shaft 255 there is keyed a pinion 262 which engages wide teeth 263 in a collar 264 which is rotatable on a sleeve 265 mounted in a stationary position on the inner face of plate 85. The inner surface of the collar 264 and the outer surface of the sleeve 265 are provided with steep pitch threads, whereby rotation of the collar 264 by the gear 262 will cause the collar to move in and out lengthwise of shaft 13. Movement of the collar 264 inward causes the collar to engage bevel surfaces on the pawls 73 and forces those pawls outwardly to break their engagement with the notches in the collar 72, thus disconnecting the drive between the worm wheel and the shaft 13.

Figure 7:
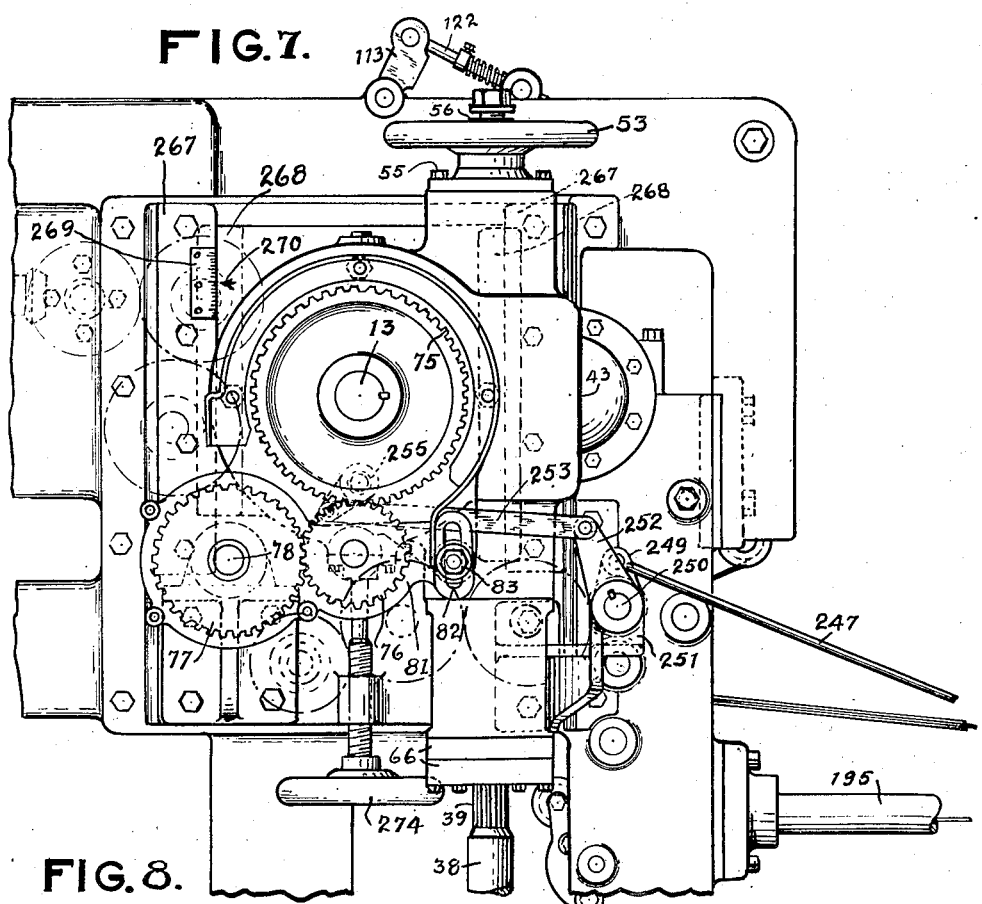
Fig. 7 is a fragmental elevational view looking in the direction indicated by the line 7—7 of Fig. 4.

Thus, movement of the control rod 247 in the throw-off direction, that is to the left in Fig. 12, causes movement of the link 253 to the right in Figs. 7 and 8, with the result that the short shaft 255 is rotated bringing the flattened end 256 to a vertical position and permitting the brake shoes to grip the brake drum at the same time that the gear 262 rotates the collar 264 causing it to move endwise of the shaft 13 and to force the pawls 73 out of the notches. Since the entire web feeding and sheet cutoff mechanisms including the forwarding tapes are driven from shaft 13 the stopping of this shaft disables the entire feeder.

After the operation of the feeder has been automatically stopped in this manner its operation may be resumed by the manual actuation of a hand lever 266, Fig. 2, indirectly connected to control rod 247. When this rod is moved toward the right in that figure link 253 is shifted back to its position of Fig. 8, when the brake shoes 259 are retracted, freeing the shaft 13. At the same time the short shaft 255 is rotated, causing pinion 262 to rotate sleeve 264 so as to back it away from contact with the pawls 73, whereupon the springs 74 shift the pawls into operative relation with the collar 72 as soon as the worm wheel 68 comes into the proper angular position. The two pawls 73 working in opposition to each other insure a positive connection between the worm wheel and the shaft at all times, which is quite essential inasmuch as the acceleration and deceleration of the cutting cylinders, on account of the Whitworth crank mechanism, imposes a reverse load upon the worm wheel periodically.

*Operation*

Before starting the machine a gear 75 is selected, of suitable size to correspond with the length of sheet which it is desired to cut from the web, and the movable housing 43 is raised or lowered to a position previously determined as required to produce the proper speed of the knives when cutting a sheet of that length. The idler gear 76 is of course brought into mesh with the selected gear 75 and clamped in that position. The pressure rollers 25 and 26 are drawn away from the web feeding rollers 23 and 24 by means of the hand lever 127, and the web is trained about these rollers and down between the cutting cylinders into the bight of the rollers 172 and 173.

After thus threading the machine the press may be started and operated at idle speed. The hand lever 266 is then moved to its right-hand position to cause control rod 247 to release the brake and engage the clutch of the feeder. This starts the feeding of the web and the cutting of the sheets. The hand lever is held in this position until the first sheet cut from the web passes the detector after which it may be released. The sheets are carried forward between the tapes 29 and 30, and after the leading edge of a sheet has reached a position between the feeding rollers 31 and 32 these rollers engage the sheet, accelerate it to a speed equal to or slightly greater than that of the impression cylinder, and continue to feed it forward until its leading edge is in position to be taken by the grippers of the impression cylinder. The precise position of the forward edge of the sheet at the time when the sheet is engaged by the feeding rollers may be altered or adjusted by the adjustment of worm 42 vertically with respect to worm wheel 68 by means of hand wheel 53. This same adjustment of course controls the position of the forward edge of the sheet at the time it is taken by the sheet grippers 243, and in this way the position of the printing on the sheet may be altered slightly or exact positioning of the sheet with respect to the grippers may be effected. The sheet, after it is severed from the web, is always under positive control, that is to say it is held between the tapes 29 and 30 of the sheet conveyor until its forward edge is placed upon the feeding plate 212, and then before its rear edge is released by the conveyor its forward edge is taken by the feeding rollers 31 and 32 and the sheet is kept under the control of those rollers until its forward edge is taken by the grippers 243 of the impression cylinder. Hence its alignment and register are properly maintained at all times.

While I have illustrated cutting mechanism in which the cutting cylinders each carry only one knife and make one revolution for each sheet cut, cylinders carrying two or more knives may be employed in which case appropriate gearing could be provided between the driven disk of my Whitworth driving mechanism and the cutting cylinders thus resulting in a plurality of changes from maximum to minimum speed in each revolution of the cutting cylinders.

It is also apparent that a plurality of webs, associated by known means, may be fed to the cutting knives and thus a plurality of sheets severed at the same time for feeding to folding or associated machines.

Having thus described my invention, I claim:

1. In mechanism for cutting sheets from a web and feeding them to a machine for operating upon them, a shaft geared to said machine to rotate at a speed proportional to the speed of the machine, rotary cutting knives driven from said shaft to sever a sheet from the web for each sheet operated upon by the machine, a control for the driving means of said knives adapted to regulate the speed of the knives at the instant of cutting to correspond approximately with the web speed, means comprising change speed gearing driven from said shaft to convey the web at different selected speeds, means also comprising said change speed gearing driven from said shaft to convey the severed sheets toward the machine at speeds proportional to and at least as great as the different selected web speeds, and feed-in rollers rotating with a peripheral speed equal to or greater than the highest selected speed of said sheet conveying means adapted to grip each sheet before it is released by said sheet conveying means and to forward it to said machine.

2. In mechanism for cutting sheets from a web and feeding them to a machine operating at a given speed, a first shaft operatively connected with said machine to rotate in synchronism therewith, a second shaft at an angle to the first shaft and driven thereby in a given rotative angular relation thereto, means permitting movement of the second shaft in a direction transverse to its axis without disturbing the operative connections between the shafts nor their rotative angular relation, means comprising change speed gearing driven from said second shaft to convey the web at any one of a plurality of different speeds, a pair of intergeared rotary cutting knives, means for driving one of said knives from said second shaft comprising a Whitworth crank mechanism one element of which is carried by said driven knife and the other by said second shaft, and means for adjusting said second shaft in a direction transverse to its axis.

3. In mechanism for cutting sheets from a web and feeding them to a machine operating at a given speed, a first shaft operatively connected with said machine to rotate in synchronism therewith, a second shaft at right angles to the first shaft and geared thereto, means permitting movement of the second shaft in a direction transverse to its axis without disturbing the operative connections between the shafts nor their rotative angular relation, means comprising change speed gearing driven from said second shaft to convey the web at any one of a plurality of different speeds, a pair of intergeared rotary cutting knives, means for driving one of said knives from said second shaft comprising a Whitworth crank mechanism one element of which is carried by said driven knife and the other by said second shaft, and means for adjusting said second shaft in a direction transverse to its axis.

4. Mechanism as claimed in claim 3 wherein the shafts are geared together by a worm wheel on said second shaft and a worm on said first shaft and wherein the means permitting movement of said second shaft in a direction transverse to its axis comprises a housing supporting said second shaft, worm and worm wheel, said housing being movable in a direction transverse to the axis of said second shaft.

5. In mechanism of the class described a machine for operating upon sheets, a web supply, means for conveying the web at different selected speeds, rotary cutting knives for severing sheets from the web, adjustable means for varying the speed of said knives during each rotation to correspond approximately to web speed at the instant of cutting, means engaging the leading edge of the web before a sheet is severed for conveying the severed sheet from the cutting knives to the machine in controlled relation to the timing of the machine, driving connections between said adjustable means and the machine for driving the knives in timed relation to the machine, said connections comprising a driven element having fixed angular relation with the cutting knives at the moment of cutting and a driving element having fixed angular relation to the machine, said connections being arranged to permit angular adjustment of said elements relative to each other while in operation, and means for adjusting one of said elements relative to the other to vary the angular relation between the machine and the cutting knives while the latter are in operation.

6. In mechanism of the class described, a machine for operating upon sheets, a web supply, rotary cutting knives for severing sheets from the web, means engaging the leading edge of the web before a sheet is severed for conveying the severed sheet from the cutting knives to the machine in controlled relation to the timing of the machine, driving connections between the cutting knives and the machine for driving the knives in timed relation to the machine, said connections comprising a worm and worm wheel, and means for adjusting said worm axially to vary the angular relation between the machine and the cutting knives while the latter are in operation.

7. In mechanism of the class described, a cutter for severing sheets from a web, a shaft, a worm wheel thereon, a driven worm meshing with said worm wheel, a Whitworth crank mechanism at one end of said shaft for operating said cutter, means for moving said shaft, worm wheel and worm bodily in a direction parallel to the axis of said worm for varying the motion delivered by said crank mechanism to said cutter, and means for moving said worm axially relative to the worm wheel.

8. In a machine for cutting sheets from a web and feeding them to a printing machine or the like, a shaft, sheet cutting mechanism, means operated by said shaft for driving said cutting mechanism with an irregular motion and in timed relation to said machine, gearing for rotating said shaft in synchronism with said machine at a constant rate of speed, and a clutch for connecting said gearing to said shaft, said clutch comprising two pawls one adapted to transmit motion in one direction and the other adapted to transmit motion in the opposite direction.

9. In a machine for cutting sheets from a web and feeding them to a printing machine or the like, a shaft, sheet cutting mechanism, means operated by said shaft for driving said cutting mechanism with an irregular motion and in timed relation to said machine, gearing for rotating said shaft in synchronism with said machine at a constant rate of speed, a clutch for connecting said gearing to said shaft, said clutch comprising two pawls one adapted to transmit motion in one direction and the other adapted to transmit motion in the opposite direction, and throw-off means arranged to withdraw both of said pawls simultaneously.

10. In a machine of the class described, means for cutting sheets from a traveling web, means for moving the sheets seriatim toward a rotating cylinder of a printing press at a speed less than the peripheral speed of said cylinder, and roller means adjacent the cylinder operating to grip each sheet in turn and advance it to the cylinder at a speed equal to or greater than the peripheral speed of said cylinder, said roller means comprising a continuously driven first roller and a second roller, and means for moving one of said rollers toward and away from the other to bring the rollers into cooperative relation with each other at timed intervals.

11. In a mechanism for cutting sheets of different lengths from a web movable at different speeds and feeding them to a printing press or other machine for operating upon the sheets, rotating cutters arranged to sever sheets from the moving web, conveying means for the severed sheets comprising endless tapes operating above and below the sheets at a speed slightly greater than and proportional to web speed, said tapes being arranged to take the forward ends of the sheets before they are severed from the web, whereby the web is tensioned substantially uniformly for all web speeds, a feed plate onto which the sheets are delivered by said tapes, and feed-in rollers adapted to grip a sheet on the feed plate and drive it forward toward the said machine at a higher speed.

12. In mechanism for cutting sheets of different lengths from a web movable at different speeds and feeding them to a printing press or other machine for operating upon the sheets, rotating cutters arranged to sever sheets from the moving web, conveying means for the severed sheets comprising endless tapes operating above and below the sheets at a speed slightly greater than and proportional to web speed, said tapes being arranged to take the forward ends of the sheets before they are severed from the web, whereby the web is tensioned substantially uniformly for all web speeds, a feed plate onto which the sheets are delivered by said tapes, and feed-in rollers adapted to grip a sheet on the feed plate before its rear end is released by said tapes, said rollers being driven at a higher rate of speed than said tapes whereby the sheet is drawn forward out of the tapes and driven toward the said machine.

13. In mechanism for cutting sheets of different lengths from a web movable at different speeds and feeding them to a printing press or other machine for operating upon the sheets, rotating cutters arranged to sever sheets from the moving web, conveying means for the severed sheets comprising endless tapes operating above and below the sheets at a speed slightly greater than and proportional to web speed, said tapes being arranged to take the forward ends of the sheets before they are severed from the web, whereby the web is tensioned substantially uniformly for all web speeds a feed plate onto which the sheets are delivered by said tapes, and feed-in rollers adapted to grip a sheet on the feed plate before its rear end is released by said tapes, said rollers being driven at a higher rate of speed than said tapes whereby the sheet is drawn forward out of the tapes and driven toward the said machine, said rollers further being arranged to maintain their grip upon the sheet until the latter is taken by the printing press, whereby the sheets are continuously under control from the time of cutting to the time they are taken by the press.

14. In mechanism for cutting sheets of different lengths from a web movable at different speeds and feeding them to the impression cylinder of a printing press or other machine for operating upon the sheets, rotating cutters arranged to sever sheets from the moving web, conveying means for the severed sheets comprising endless tapes operating above and below the sheets to convey the sheets at a speed proportional to web speed and less than the peripheral speed of said impression cylinder, said tapes being arranged to take the forward ends of the sheets before they are severed from the web, a feed plate onto which the sheets are delivered by said tapes, and feed-in rollers adapted to grip a sheet on the feed plate before its rear end is released by said tapes, said rollers being driven at a speed equal to or greater than the peripheral speed of said impression cylinder, whereby the sheet is drawn forward out of the tapes and driven toward said impression cylinder.

15. In mechanism for cutting sheets of different lengths from a web movable at different speeds and feeding them to a printing press or other machine for operating upon the sheets, rotating cutters arranged to sever sheets from the moving web, conveying means for the severed sheets comprising endless tapes operating above and below the sheets at a speed slightly greater than and proportional to web speed, said tapes being arranged to take the forward ends of the sheets before they are severed from the web, a feed plate onto which the sheets are delivered by said tapes, forward roller supports for said endless tapes, said supports being offset from each other in a forward and rearward direction so that there is no pinching of the sheets by the forward end of the tape conveyor, and feed-in rollers adapted to grip a sheet on the feed plate before it is released by said tapes, pull it forward out of the tapes, and drive it forward toward the said machine.

16. In mechanism for cutting sheets from a web and feeding them to a machine for operating upon them, a driving member, means comprising change speed gearing driven by said member to convey the web at different selected speeds, rotary cutting knives for cutting sheets from the web arranged to have a speed corresponding substantially to that of the web during their cutting action, sheet conveying means driven by said member through said change speed gearing with speeds proportional to and slightly greater than said different selected speeds, said sheet conveying means being arranged to engage the leading edge of the web before each sheet is cut, whereby the leading portion of the web is held under substantially the same tension prior to the cutting of each sheet regardless of the speed selected.

17. In a machine for cutting sheets from a moving web and delivering them at a given rate of speed regardless of the length of the sheets, means for cutting sheets of a selected length from the moving web, conveyor means for moving the severed sheets seriatim away from the cutting means at a speed less than said given rate of speed and proportional to the length of sheet being cut, and roller means adjacent the forward end of said conveyor means to grip each sheet in turn and advance it at said given rate of speed.

18. In a machine of the class described, means for cutting from a moving web sheets of a certain maximum length or of some lesser selected length, conveyor means for moving the severed sheets seriatim away from the cutting means at a speed proportional to the length of sheet being cut, and roller means adjacent the forward end of said conveyor means to grip each sheet in turn and deliver it at a predetermined speed equal to or greater than the maximum speed of movement of sheets on said conveyor means, whereby sheets are delivered at a uniform rate regardless of the length of sheet being cut.

CHRISTEN R. KADDELAND.